(12) United States Patent
Maria

(10) Patent No.: US 9,363,278 B2
(45) Date of Patent: Jun. 7, 2016

(54) DYNAMIC AND SELECTIVE RESPONSE TO CYBER ATTACK FOR TELECOMMUNICATIONS CARRIER NETWORKS

(75) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 332 days.

(21) Appl. No.: 13/105,841

(22) Filed: May 11, 2011

(65) Prior Publication Data

US 2012/0291125 A1 Nov. 15, 2012

(51) Int. Cl.
*H04L 29/06* (2006.01)
*H04W 28/02* (2009.01)
*H04L 12/58* (2006.01)

(52) U.S. Cl.
CPC ........ *H04L 63/1416* (2013.01); *H04L 63/1458* (2013.01); *H04W 28/0268* (2013.01); *H04L 51/12* (2013.01)

(58) Field of Classification Search
CPC H04L 63/1458; H04L 51/12; H04W 28/0268
USPC .......................................................... 726/22
See application file for complete search history.

(56) References Cited

U.S. PATENT DOCUMENTS

| | | | | |
|---|---|---|---|---|
| 6,308,203 B1 * | 10/2001 | Itabashi | ............ | G06F 17/30867 707/999.01 |
| 7,584,507 B1 * | 9/2009 | Nucci | ................. | H04L 63/1416 726/22 |
| 7,676,841 B2 * | 3/2010 | Sobchuk | ................. | G06F 21/56 726/23 |
| 7,870,203 B2 * | 1/2011 | Judge | ................... | G06Q 10/107 709/201 |
| 7,870,601 B2 * | 1/2011 | Pandey | ................... | H04L 63/08 726/2 |
| 7,949,329 B2 * | 5/2011 | Benco | ................... | H04W 12/12 455/410 |
| 8,060,936 B2 * | 11/2011 | Mahaffey | .............. | G06F 21/577 713/188 |
| 8,064,909 B2 * | 11/2011 | Spinelli | ................. | H04W 36/36 455/436 |
| 8,224,308 B1 * | 7/2012 | Gavrylyako | .......... | H04L 67/306 455/405 |

(Continued)

OTHER PUBLICATIONS

Nokia. Selective Disabling of UE Capabilities. 3GPP TSG SA3 working document S3-040873I; Oct. 5-8, 2004.*

(Continued)

*Primary Examiner* — James Turchen
(74) *Attorney, Agent, or Firm* — Amin, Turocy & Watson, LLP

(57) ABSTRACT

The disclosed subject matter provides a response to a cyber attack on a carrier network. The response can be based on inspection of traffic flowing through a carrier network. The response can automatically adapt the traffic flow in response to a perceived threat. Traffic can be adapted by dynamically updating permission variables related to allowing access for user equipment (UE) to a carrier network, withdrawing or denying access to the carrier network for selected UEs. In other embodiments, signaling can be initiated at the carrier network to cause selected UEs to disable transmission of traffic contributing to the traffic flow. Determining a cyber attack condition can be based on predetermined rules associated with the traffic flow. Further, the determination can be performed at a front end of the carrier network to limit exposure of the carrier network to a detected cyber attack.

20 Claims, 11 Drawing Sheets

(56) References Cited

U.S. PATENT DOCUMENTS

| | | | | |
|---|---|---|---|---|
| 8,266,284 | B2* | 9/2012 | Iverson | H04L 9/32 709/225 |
| 8,320,334 | B2* | 11/2012 | Thomas | H04W 36/0022 370/331 |
| 8,413,209 | B2* | 4/2013 | Aldera | H04L 63/102 713/185 |
| 8,549,611 | B2* | 10/2013 | Judge | H04L 12/585 726/13 |
| 8,561,167 | B2* | 10/2013 | Alperovitch | H04L 63/1425 709/223 |
| 2002/0176377 | A1* | 11/2002 | Hamilton | H04L 12/24 370/328 |
| 2004/0152446 | A1* | 8/2004 | Saunders | H04L 29/12009 455/411 |
| 2005/0182950 | A1* | 8/2005 | Son | H04L 63/0209 713/189 |
| 2005/0249196 | A1* | 11/2005 | Ansari | H04L 12/2803 370/352 |
| 2006/0015942 | A1* | 1/2006 | Judge | H04L 51/12 726/24 |
| 2006/0090067 | A1* | 4/2006 | Edmonds | H04L 63/083 713/159 |
| 2008/0066145 | A1* | 3/2008 | Molen | H04L 12/2814 726/1 |
| 2008/0109905 | A1* | 5/2008 | Grosse | H04L 63/1458 726/23 |
| 2008/0227391 | A1* | 9/2008 | Rosenberg | G06Q 20/3226 455/41.1 |
| 2008/0275819 | A1* | 11/2008 | Rifai | G06Q 20/32 705/44 |
| 2008/0318550 | A1* | 12/2008 | DeAtley | H04L 63/08 455/411 |
| 2009/0061840 | A1* | 3/2009 | Fleischman | H04L 41/0809 455/419 |
| 2009/0232019 | A1* | 9/2009 | Gupta | H04L 12/287 370/252 |
| 2009/0235069 | A1* | 9/2009 | Sonnega | H04L 63/062 713/156 |
| 2009/0254663 | A1* | 10/2009 | Alperovitch | H04L 45/02 709/227 |
| 2009/0254993 | A1* | 10/2009 | Leone | G06F 21/51 726/25 |
| 2009/0307485 | A1* | 12/2009 | Weniger | H04L 63/1458 713/153 |
| 2010/0064341 | A1* | 3/2010 | Aldera | H04L 63/102 726/1 |
| 2010/0082513 | A1* | 4/2010 | Liu | H04L 63/1458 706/46 |
| 2010/0175131 | A1* | 7/2010 | Sheymov | H04L 29/12783 726/22 |
| 2010/0281160 | A1* | 11/2010 | Ros-Giralt | H04L 43/18 709/224 |
| 2010/0290353 | A1* | 11/2010 | Barford | H04L 12/26 370/252 |
| 2010/0312692 | A1* | 12/2010 | Teicher | G06Q 20/10 705/39 |
| 2011/0062230 | A1* | 3/2011 | Ward, II | G06Q 20/105 235/377 |
| 2011/0145920 | A1* | 6/2011 | Mahaffey | G06F 21/564 726/22 |
| 2011/0199902 | A1* | 8/2011 | Leavy | H04L 43/0876 370/232 |
| 2011/0214174 | A1* | 9/2011 | Herzog | H04L 63/0807 726/10 |
| 2011/0314145 | A1* | 12/2011 | Raleigh | H04L 41/0893 709/224 |
| 2012/0040638 | A1* | 2/2012 | Lovell, Jr. | G06Q 20/16 455/406 |
| 2012/0054098 | A1* | 3/2012 | Yu | G06Q 20/102 705/40 |
| 2012/0096513 | A1* | 4/2012 | Raleigh et al. | 726/1 |
| 2012/0130891 | A1* | 5/2012 | Bogaard | G07B 15/02 705/40 |
| 2012/0174219 | A1* | 7/2012 | Hernandez | G06F 21/562 726/22 |
| 2012/0265898 | A1* | 10/2012 | Kruglick | H04L 47/24 709/235 |
| 2013/0016624 | A1* | 1/2013 | Li | H04L 41/5009 370/252 |

OTHER PUBLICATIONS

Implications of Unlicensed Mobile Access (UMA) for GSM security; Sandro Grech et al.; Proceedings of the First International Conference on Security and Privacy for Emerging Areas in Communications Networks; IEEE; 2005.*

3rd Generation Partnership Project; Technical Specification Group Core Network and Terminals; Selective Disabling of 3GPP User Equipment Capabilities (SDoUE) Management Object (MO); (Release 9); 2009.*

* cited by examiner

DYNAMIC AND SELECTIVE RESPONSE TO CYBER ATTACK FOR TELECOMMUNICATIONS CARRIER NETWORKS

TECHNICAL FIELD

The disclosed subject matter relates to carrier network security and, more particularly, to responding to a cyber attack from within a carrier network.

BACKGROUND

Conventional telecommunications carrier network response to a large scale cyber attack is generally either very slow or are highly unselective. Security planners are concerned about viruses and malware that can be downloaded to smartphones and attack carrier networks, such as by initiating a denial of service attack, etc. Smartphones may still become infected, despite mobile anti-virus software, and malware, botnets, etc. can pose a significant threat to services on a carrier network, for example by subjecting the carrier network to a massive-scale attack.

A typical response to a determination that a cyber attack is occurring can be brutally coarse. Responses for some carrier networks include simply shutting down entire markets that include attacking user equipment, such as smartphones, femto-cells, etc. This highly unselective response to a cyber attack on a carrier network may stop or limit the effects of the cyber attack, but such response comes at the cost of potentially denying service to uninfected user equipment.

Another response to a cyber attack can include manually or individually updating profiles associated with user equipment to deny those specific devices a pathway to propagate the attack into a carrier network. This type of response can be effective for small scale cyber attacks, but is woefully insufficient for large scale attacks where the cumulative response time would be untenable.

Further, detection of a cyber attack can be executed by carrier network systems that may not be logically located near a carrier network front end. By having a carrier security system logically removed from the carrier network front end, responses to the initiation of a cyber attack can be delayed, for example, by routing traffic information poorly, which causes a delay in the analysis of traffic patterns, etc. Delays in determining the start of a cyber attack can allow the cyber attack to be much more effective and thus, early detection and response is beneficial.

The above-described deficiencies of conventional telecommunications carrier response to a cyber attack are merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In contrast to conventional detection and response to a cyber attack on a telecommunications carrier network, dynamic and selective response to a cyber attack can be effected by a front end cyber attack processing component (FECAP). Where a carrier network includes a FECAP, it can inspect traffic near the front end of a carrier network. The FECAP can also dynamically determine a response to a detected traffic condition that can be indicative of a cyber attack. The response can be automated and highly selective.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the drawings.

DETAILED DESCRIPTION

Figure 1:
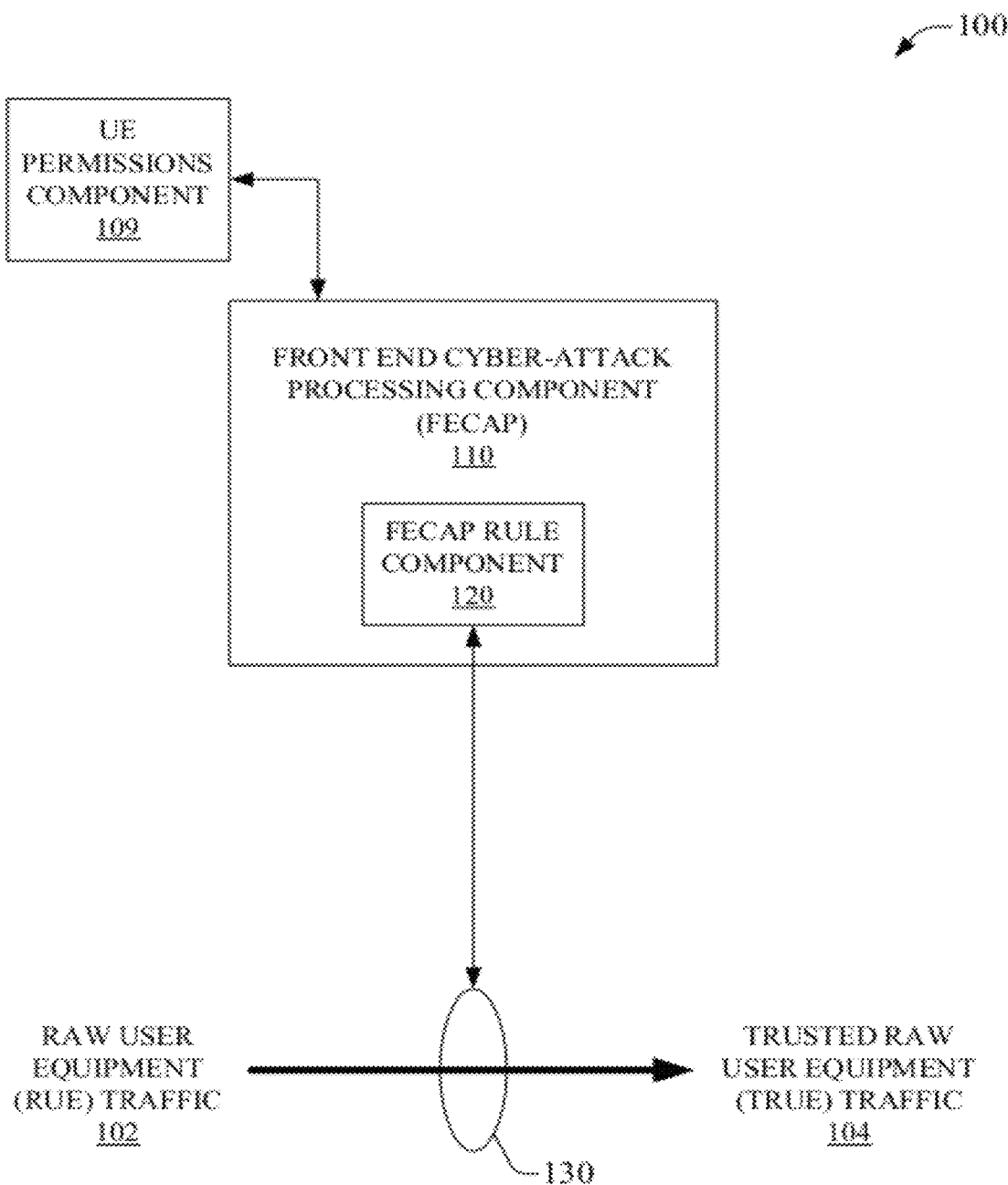
FIG. 1 is an illustration of a system that facilitates response to a cyber attack on a carrier network in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of a system 100, which facilitates a response to a cyber attack on a carrier network in accordance with aspects of the subject disclosure. System 100 can include raw user equipment (RUE) traffic 102. RUE traffic 102 can include information from a user equipment (UE), such as telecommunications data, received at a telecommunications carrier network. As a non-limiting example, RUE traffic 102 can include signals from a cellular phone that can be received at a NodeB or enhanced NodeB (eNodeB) and communicated through a radio area network (RAN) to a Serving General Packet Radio Service Support Node (SGSN) of a telecommunications carrier network. As a second non-limiting example, RUE traffic 102 can include signals from a tablet computer that can be received at a femto-cell access point and communicated through a local area network (LAN) to a telecommunications carrier network. As a third non-limiting example, RUE traffic 102 can include signals from a smartphone that can be received at a NodeB or eNodeB and communicated through a RAN to a of a telecommunications carrier network Mobility Management Entity (MME). RUE traffic 102 can include voice, data, circuit switched information, packet switched information, control information, etc. Nearly any type of data associated with communication by way of a carrier network can comprise RUE traffic 102. The modifying term "raw" is included to indicate that the RUE traffic 102 can be in a state prior to inspection by other components of system 100.

System 100 can further include trusted raw user equipment (TRUE) traffic 104. TRUE traffic 104 can be a subset of RUE traffic 102. In some embodiments TRUE traffic 104 can be RUE traffic 102 after inspection by other components of system 100. In other embodiments, TRUE traffic 104 can be modified RUE traffic 102, such as a filtered subset of RUE traffic 102. As such, TRUE traffic 104 can include voice, data, circuit switched information, packet switched information, control information, etc. Nearly any type of data associated with communication by way of a carrier network can comprise TRUE traffic 104. The modifying term "trusted" is included to indicate that the TRUE traffic 104 can be in a state subsequent to inspection by other components of system 100.

System 100 can further include UE permissions component 109. UE permissions component 109 can facilitate access to data, such as that stored in a data store or database, that contains details of each UE authorized to access a carrier network. As a non-limiting example, UE permissions component 109 can be a home location register (HLR), visitor location register (VLR), equipment identity register (EIR), etc. In some embodiments, UE permissions component 109 can be associated with one or more variables that can indicate a suspension of privileges to access the carrier network, revocation of privileges to access the carrier network, a reinstatement of privileges to access the carrier network, a limitation of privileges to access the carrier network, a modification of privileges to access the carrier network, etc. As a non-limiting example, UE permissions component 109 can be a HLR in which a binary variable can be updated to indicate that a UE, as identified by a subscriber identity module (SIM) or enhanced SIM (eSIM) information, attempting to access the carrier network is permitted access or denied access to the carrier network. In some embodiments of system 100, the exemplary variable can be updated by components of system 100.

Moreover, system 100 can include front end cyber attack processing component (FECAP) 110. FECAP 110 can facilitate response to a cyber attack on a carrier network. FECAP 110 can include traffic interface component (TIC) 130. TIC 130 can receive RUE traffic 102 and be communicatively coupled to FECAP rule component 120. As such, FECAP rule component 120 can inspect RUE traffic 102. In some embodiments, FECAP rule component 120 can apply one or more rules, algorithms or logic, hereinafter cumulatively referred to simply as 'rules' for clarity, to the inspection of RUE traffic 102. These rules can facilitate the determination of a response to the inspected RUE traffic 102 by FECAP 110. As a non-limiting example, FECAP rule component 120 can inspect RUE traffic 102 by way of TIC 130 such that, where RUE traffic 102 satisfies a predetermined rule, FECAP 110 initiates a predetermined response. As a second non-limiting example, FECAP 110 can dynamically set a variable in an HLR denying a smartphone further access to a carrier network wherein traffic from the smartphone (e.g., RUE traffic 102) includes patterns indicative of a cyber attack and such patterns are observed by inspection of the smartphone traffic by FECAP rule component 120 by way of TIC 130. In a third non-limiting example, FECAP 110 can initiate a remote shutdown of a smartphone determined to be transmitting suspect traffic (e.g., RUE traffic 102).

As a more detailed yet non-limiting example, where many UEs have been infected with malware and have been instructed to execute a massive-scale cyber attack on a carrier network, FECAP 110 can, in an aspect, facilitate a reduction in the impact of the cyber attack. FECAP 110 can "sniff" UE traffic through the carrier network, e.g., UE traffic enters the carrier network as RUE traffic 102, is inspected by way of TIC 130, and can then be considered TRUE traffic 104 as it progresses through the remainder of the carrier network and beyond. TIC 130 inspection of RUE traffic 102 can be similar to inspection of data packets as conducted in a conventional firewall, etc. As such, FECAP 110 can be network transparent and be without a network identity. This transparency can be beneficial to preventing manipulation of FECAP 110 during a cyber attack.

Continuing the more detailed example, as the cyber attack commences, RUE traffic 102 can begin to take on characteristic features indicative of the cyber attack. These features can be monitored by FECAP 110 and FECAP rule component 120 can determine if a condition of a predetermined rule is satisfied with regard to RUE traffic 102, such as a known characteristic of a cyber attack is found in RUE traffic 102. Where the condition of the predetermined rule is satisfied, FECAP 110 can facilitate a response, such as filtering the RUE traffic 102 (e.g., TRUE traffic 104 can be a subset of RUE traffic 102 wherein offensive traffic is excluded), offending UEs can be remotely disabled (or partially disabled, see herein below), offending UEs can be designated as non-authorized users of the carrier network (e.g., designated in an HLR, etc.), . . . . The facilitated response can also be less significant where limiting UE performance is undesirable and can include, for example, more detailed inspection of the suspect portion of RUE traffic 102, redirection of the suspect portion of RUE traffic 102 to alternative carrier network equipment that can be more capable of handling a potential cyber attack, etc. Numerous other examples of responses are not explicitly recited herein for brevity, although all such responses based on RUE traffic satisfying a predetermined rule are to be considered within the scope of the subject disclosure.

In some aspects, responses to potential carrier network threats can be selective at more than one level of granularity.

As such, a response can limit access to a carrier network for a plurality of UEs, a single UE, a feature of one or more UEs, or a specific type of traffic from a one or more UEs, etc. As a non-limiting example, an offending UE can be remotely disabled. Further, the offending UE can be partially disabled, such as allowing Signaling System No. 7 (SS7) traffic but not Internet Protocol (IP) traffic from an offending UE. As a second non-limiting example of partial disablement, voice traffic can be allowed from an offending UE but data traffic from the offending UE can be "throttled", e.g., a reactive measure employed in communication networks to regulate network traffic and minimize bandwidth congestion, thus allowing data communication but at a slow enough rate so as to limit the effectiveness of any associated cyber attack. Numerous other examples of response granularity are not explicitly disclosed but are considered within the scope of the present disclosure.

It can be noted that in some embodiments, where a carrier network includes a FECAP, it can inspect traffic near the front end of a carrier network. The FECAP can also dynamically determine a response to a detected traffic condition that can be indicative of a cyber attack. The response can be automated and highly selective, such as specifically signaling an offending user equipment to cause it to cease transmitting the offending traffic, updating a home location register (HLR) to deny service to a user equipment transmitting offending traffic, etc. Moreover, wherein FECAP 110 is logically located in the carrier network, communications with other carrier network components can be conducted at Layer-2 (i.e., Data Link Layer) protocol layer for additional resistance to hacking. Further, FECAP 110 can be communicatively coupled with secondary security system (not illustrated) such as an external internet security system to provide other avenues for alerting FECAP 110 to a potential or executing cyber attack. For example, FECAP 110 can be communicatively coupled to the Department of Homeland Security's "Public Regional Information Security Event Management" (PRISEM) system, designed to offer an online early warning about cyber threats such as botnet incursions on compromised desktops to possible full-fledged cyber attacks from terrorists.

It can further be noted, a telecommunications carrier network can include, for example in a General Packet Radio Service (GPRS) network, a Serving GPRS Support Node (SGSN), a Gateway GPRS Support Node (GGSN), home location register (HLR), visitor location register (VLR), mobile switching center (MSC), etc. As a second example, in an LTE network, a telecommunications carrier network can include a System Architecture Evolution (SAE) gateway, Mobility Management Entity (MME), public data network (PDN) gateway, HLR, VLR, etc. A telecommunications carrier network can further include wireless telecommunications network components, such as, an access point (see, for example, FIG. 9), or a radio area network (RAN) (see, for example, FIG. 10). An access point can be, for example, a femto-cell.

Detecting and responding to potential cyber threats or actual cyber attacks in a dynamic and selective manner can be effective at minimizing any impact from a cyber attack. In contrast to conventional systems for responding to a cyber attack on a carrier network, which can include simply shutting down entire segments of a radio network to disable the attack, deploying cumbersome traffic filters in an ad-hoc manner, or having manual updates to individual records in an HLR, the disclosed subject matter presents an opportunity to have a transparent network element dynamically and selectively impact carrier traffic in response an inspection of traffic passing through the carrier network. Such a response can be conducted automatically to a perceived threat to the carrier network. Further, even where a response is effected, some aspects of UE communication can be left active, such as only limiting IP data but leaving voice data active. Systems, such as system 100, can offer carrier networks more numerous and more benign automatic responses to cyber threats.

Figure 2:
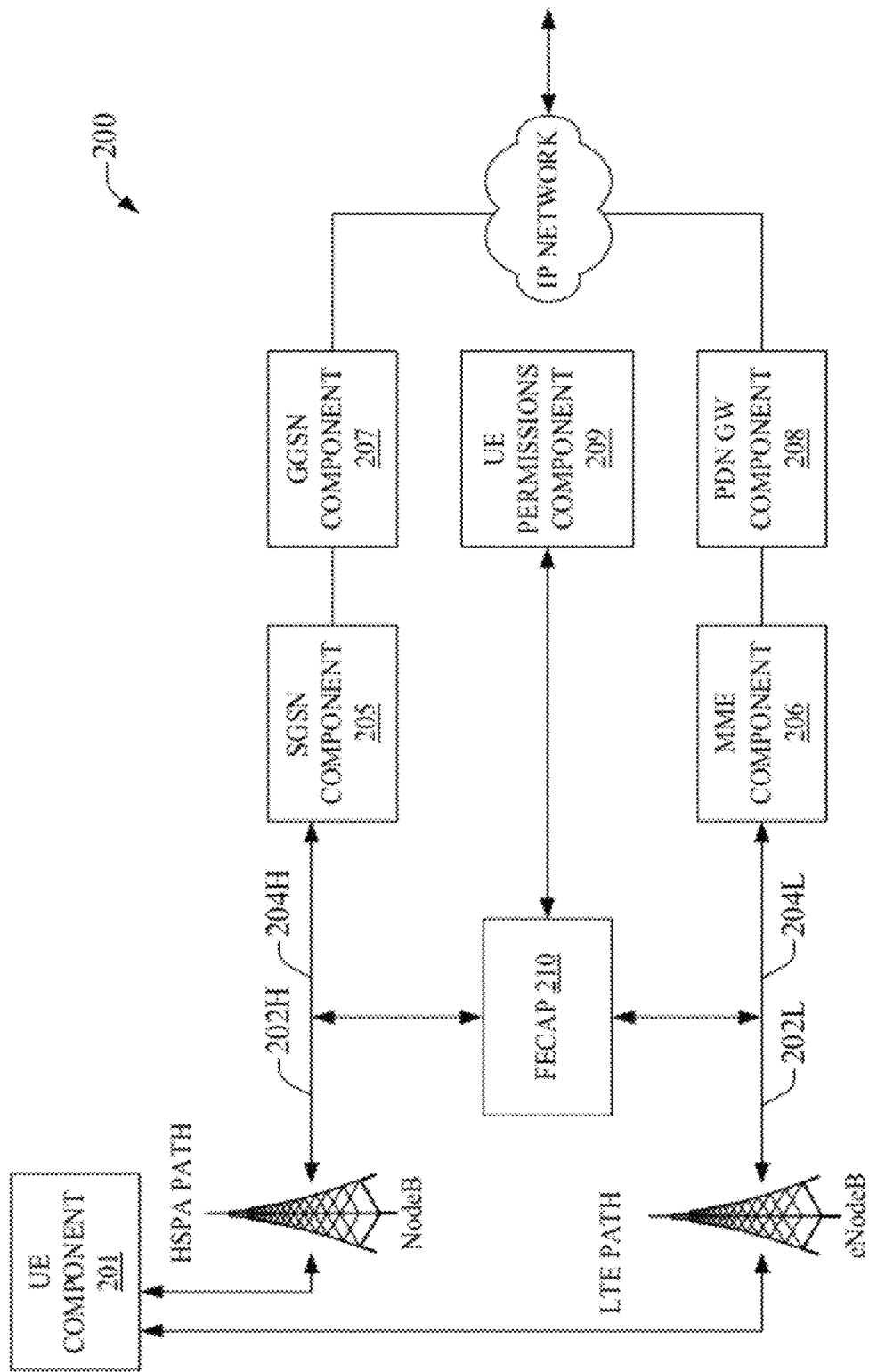
FIG. 2 is a depiction of a system that facilitates response to a cyber attack on a carrier network in accordance with aspects of the subject disclosure.

FIG. 2 is a depiction of a system 200 that can facilitate response to a cyber attack on a carrier network in accordance with aspects of the subject disclosure. System 200 can include a UE component 201. UE component 201 can be any device that can seek access to a telecommunications carrier network, such as a cell phone, pager, smartphone, tablet computer, personal computer (PC), smart meter, connected appliance (e.g., internet connected refrigerator, etc.), e-reader, car computer, etc. UE 201 can be coupled to a carrier network by numerous methods including wirelessly (e.g., HSPA, LTE, etc.), personal access point (e.g., femto-cell, picocell, microcell, etc.), wired (e.g., LAN, WAN, coaxial cable, twisted pair, etc.), optically (e.g., fiber-optic cable, line of sight laser, etc.) or nearly any other means of communicatively coupling. System 200 illustrates a High Speed Packet Access (HSPA) path by way of a NodeB and a Long Term Evolution (LTE) path by way of an eNodeB to the exclusion of other modalities simply for ease of explanation and clarity and the present disclosure is expressly not so limited.

System 200 can further include core carrier network components. A HSPA path can include, for example, Serving GPRS Support Node (SGSN) component 205 and Gateway GPRS Support Node (GGSN) component 207. An exemplary LTE path can include Mobility Management Entity (MME) component 206 and public data network (PDN) gateway component 208. System 200 can further include UE permissions component 209 in a core carrier network. As a non-limiting example, UE permissions component 209 can be a HLR, VLR, EIR, etc.

System 200 can include FECAP 210 to facilitate a response to a cyber attack on a carrier network. FECAP 210 can be communicatively coupled to UE permissions component 209. As such, FECAP 210 can receive information related to UEs authorized to pass data on the carrier network components and to make available information related to updating the permissions for UEs to continue to use the carrier network. FECAP 210 can further inspect traffic following across the carrier network, such that on an HSPA path RUE traffic 202H can be inspected and transition to TRUE traffic 204H before reaching SGSN component 205 and GGSN component 207. Similarly, on the LTE path FECAP 210 can inspect RUE traffic 202L which transitions to TRUE traffic 204L prior to reaching an MME component 206 and PDN gateway component 208. Traffic passing through the GGSN component 207 or PDN gateway component 208 can then pass through the remainder of the carrier network and eventually through an IP network to a destination. It is to be noted that FECAP 210 can be located at other points in a HSPA or LTE core carrier network and that RUE/TRUE traffic would be similarly reflected at those other points of FECAP inspection. In some embodiments, FECAP 210 can be integrated as a front end for SGSN component 205 or MME component 206, though the subject disclosure is expressly not so limited.

FECAP 210 can monitor RUE traffic (e.g., 202H and 202L) near the front of the core carrier network, e.g., as it comes from a radio network controller (RNC, not illustrated) into a carrier core network. Further, FECAP 210 can automatically respond to observed RUE traffic conditions. As a more detailed non-limiting example, where UE 201 is a virus infected embedded automobile computer authenticated to the carrier network, where UE 201 sends RUE traffic (e.g., 202H or 202L) that is inspected by FECAP 210, FECAP 210 can determine compliance with one or more traffic rules. Where the inspected RUE traffic does not comply with the traffic rules, FECAP 210 can initiate a response. This response can be automatic. Further, the response can dynamically alter the flow of the non-compliant traffic to prevent or mitigate the effects of a cyber attack. For example, FECAP 210 can dynamically alter the permissions for access to the carrier network by updating variables of the UE permissions component 209. As another example, FECAP 210 can initiate the disablement of all or part of UE 201. Thus, where the exemplary embedded car computer is determined to be transmitting offensive data, FECAP 210 can send a signal by way of a RNC to the car computer to disable the transmission of data and set an alert (e.g., "check engine" light, email, text message, form letter, etc.) so that the vehicle computer can be disinfected. Further, the FECAP 210 can simultaneously update the HLR (e.g., UE permissions component 209) such that the offending car computer is not allowed to authenticate to the carrier network. Numerous other responses are not expressly disclosed for this example, although all such responses are within the scope of the disclosed subject matter.

Figure 3:
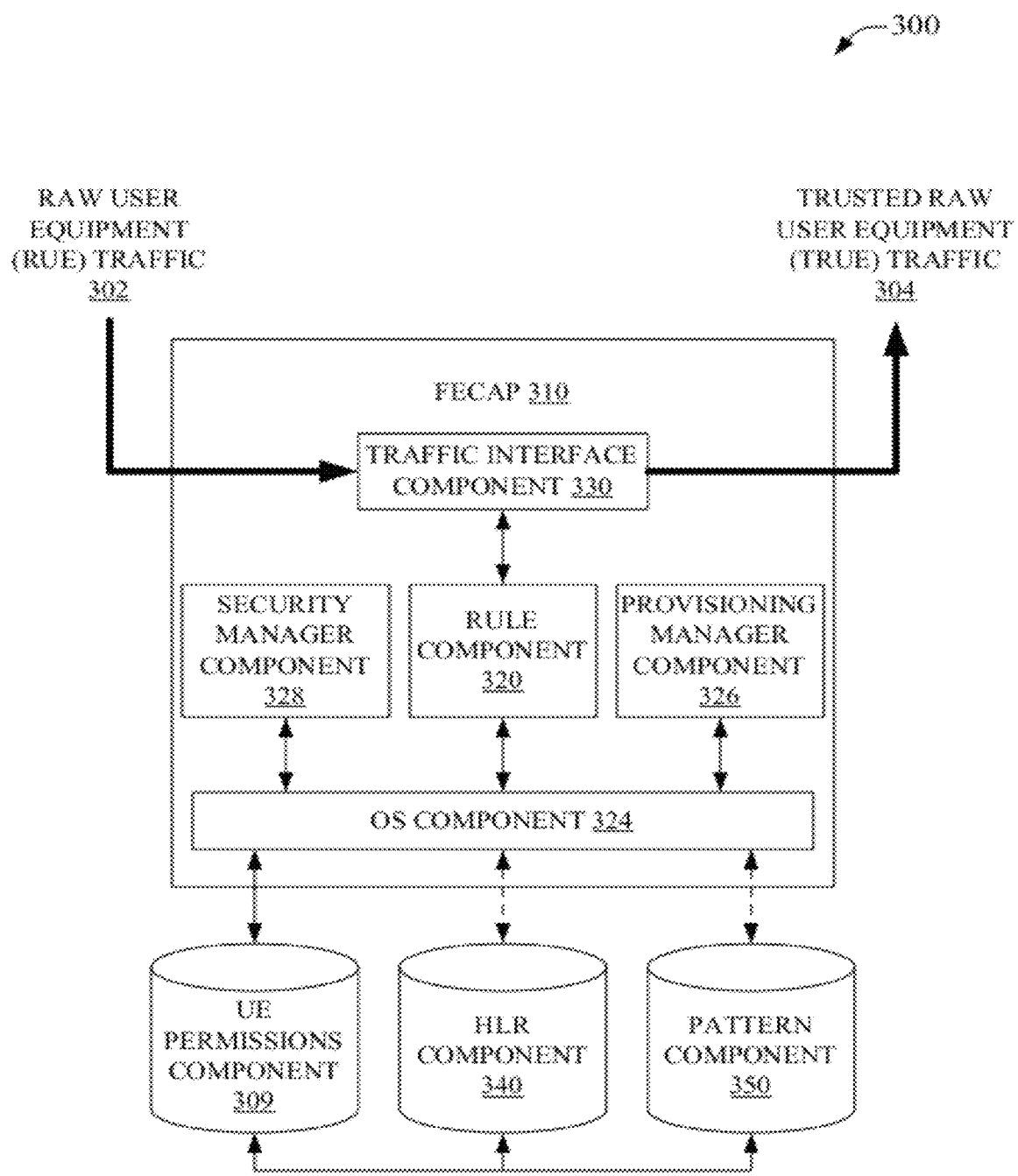
FIG. 3 illustrates a system that facilitates response to a cyber attack on a carrier network in accordance with the disclosed subject matter.

FIG. 3 illustrates a system 300 that facilitates response to a cyber attack on a carrier network in accordance with aspects of the subject disclosure. System 300 can include RUE traffic 302 and TRUE traffic 304. System 300 can further include FECAP 310, which can include traffic interface component (TIC) 330. TIC 330 can inspect RUE traffic 302 that transitions to TRUE traffic 304 after inspection at TIC 330. TIC 330 can be communicatively couple to rule component 320. Rule component 320 can apply one or more rules to the inspection of traffic at TIC 330 to determine compliance with the rule. Where RUE traffic 302 satisfies a predetermined rule applied by rule component 320, FECAP 310 can initiates a predetermined response.

In some embodiments, FECAP 310 can include an operating system (OS) component 324. Rule component 320 can be communicatively coupled to OS component 324. OS component 324 can further be communicatively coupled to UE permissions component 309. In some embodiments OS component 324 can further be communicatively coupled to HLR component 340. HLR component 340 can facilitate access to details of entities authorized to use a core network, such as a cellular phone subscriber information, smart meter location information, parking meter identification information, etc. In other embodiments OS component 324 can also be communicatively coupled to pattern component 350. Further, OS component 324 can be communicatively coupled to HLR component 340 or pattern component 350 by way of UE permissions component 309. Rule component 320 can receive traffic patterns from pattern component 350 and employ these traffic patterns in determining RUE traffic 302 compliance with a rule. Further, where a response is initiated, rule component can update UE permissions component 309 and/or HLR component 340.

Pattern component 350 can include a data store of traffic patterns. These traffic patterns can be employed in determining compliance with one or more rules as applied in rule component 320. Patterns can indicate acceptable or unacceptable traffic conditions. For example, a pattern can represent a signature for a particular type of cyber attack and can be used to flag suspected malicious activity in RUE traffic 302. In another example, a pattern can indicate typical traffic conditions such that RUE traffic 302 departing sufficiently from the pattern can be a condition that initiates a response. As a third example, a set of patterns can be employed as boundary patterns such that where RUE traffic 302 remains between the two patterns it can be considered non-threatening traffic. In some embodiments, RUE traffic 302 patterns can be made available to pattern component 350. As such, RUE traffic 302 can be further processed, such as being stored for later use (e.g., a baseline, suspect activity, etc.), more closely examined for indicators of cyber threats, etc.

FECAP 310 can further include provisioning manager component 326. Provisioning manager 326 can be communicatively couple to OS component 324 and can provision FECAP 310. Provisioning manager 326 can facilitate access to rules for rule component 320. Similarly, provisioning manager 326 can facilitate access to responses for rule component 320. Further, updates to TIC component 320 can be by way of provisioning manager component 326. Moreover, provisioning manager 326 can designate device and configuration information for one or more FECAP 310 in a carrier network.

FECAP 310 can also include security manager component 328. Where security manager component 328 is included, it can facilitate access to rules and responses for rule component 320. Further, security manager component 328 can manage a security catalog including alternate rules, responses, etc. In some embodiments, security manager component 328 can facilitate access to secondary security systems. These secondary security systems can facilitate access to indicators of a cyber attack to FECAP 310 outside of the inspection of RUE traffic 302. As such, FECAP 310 can be responsive to external determinations of cyber threats and can, in some embodiments, act as a source of information to these secondary security systems.

As depicted for system 300, UE permissions component 309, HLR component 340, and pattern component 350 can separate from FECAP 310. As such, UE permissions component 309, HLR component 340, and pattern component 350 can be local, remote, or distributed components. Further, UE permissions component 309, HLR component 340, or pattern component 350 can also be part of FECAP 310 (though not illustrated in system 300).

Figure 4:
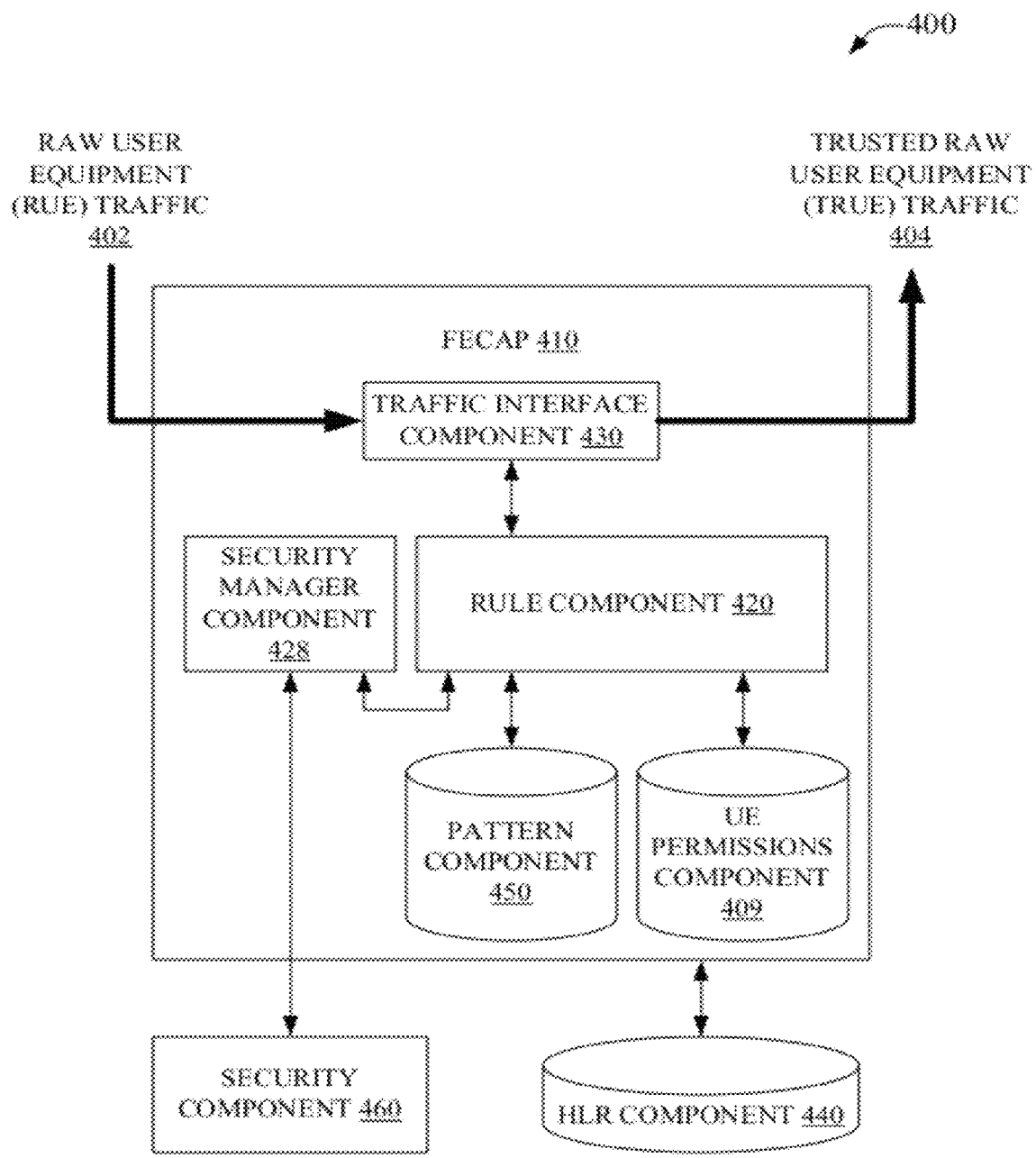
FIG. 4 is a depiction of a system that facilitates response to a cyber attack on a carrier network in accordance with aspects of the subject disclosure.

FIG. 4 is a depiction of a system 400 that facilitates response to a cyber attack on a carrier network in accordance with aspects of the subject disclosure. System 400 can include RUE traffic 402 and TRUE traffic 404. System 400 can further include FECAP 410, which can include TIC 430. TIC 430 can inspect RUE traffic 402 that transitions to TRUE traffic 404 after inspection at TIC 430. TIC 430 can be communicatively coupled to rule component 420. Rule component 420 can apply one or more rules to the inspection of RUE traffic 402 at TIC 430 to determine compliance with the rule. Where RUE traffic 402 satisfies a predetermined rule applied by rule component 420, FECAP 410 can initiates a predetermined response.

FECAP 410 can include UE permissions component 409. FECAP 410 can further include pattern component 450. Rule component 420 can be communicatively coupled to UE permissions component 409. In other embodiments rule component 420 can also be communicatively coupled to pattern component 450. Pattern component 450 can include a data store of traffic patterns. In some embodiments, FECAP 410 can further be communicatively coupled to HLR component 440. HLR component 440 can facilitate access to details of entities authorized to use a core network, such as a cellular phone subscriber information, smart meter location information, parking meter identification information, etc. Rule component 420 can receive traffic patterns from pattern component 450 and employ these traffic patterns in determining RUE traffic 402 compliance with a rule. Further, where a response is initiated, rule component 420 can update UE permissions component 409 and/or HLR component 440.

FECAP 410 can further include security manager component 428. Security manager component 428 can facilitate access to rules and responses for rule component 420. Security manager component 428 can be communicatively coupled to rule component 420. Further, security manager component 428 can manage a security catalog including alternate rules, responses, etc. Security manager component 428 can be communicatively coupled to security component 460. Security component 460 can be a secondary security systems can facilitate access to indicators of a cyber attack. As such, security component 460 can source cyber threat information to FECAP 410 in addition to FECAP 410 inspection of RUE traffic 402. As such, FECAP 410 can be responsive to external determinations of cyber threats and can, in some embodiments, act as a source of information to security component 460.

Figure 5:
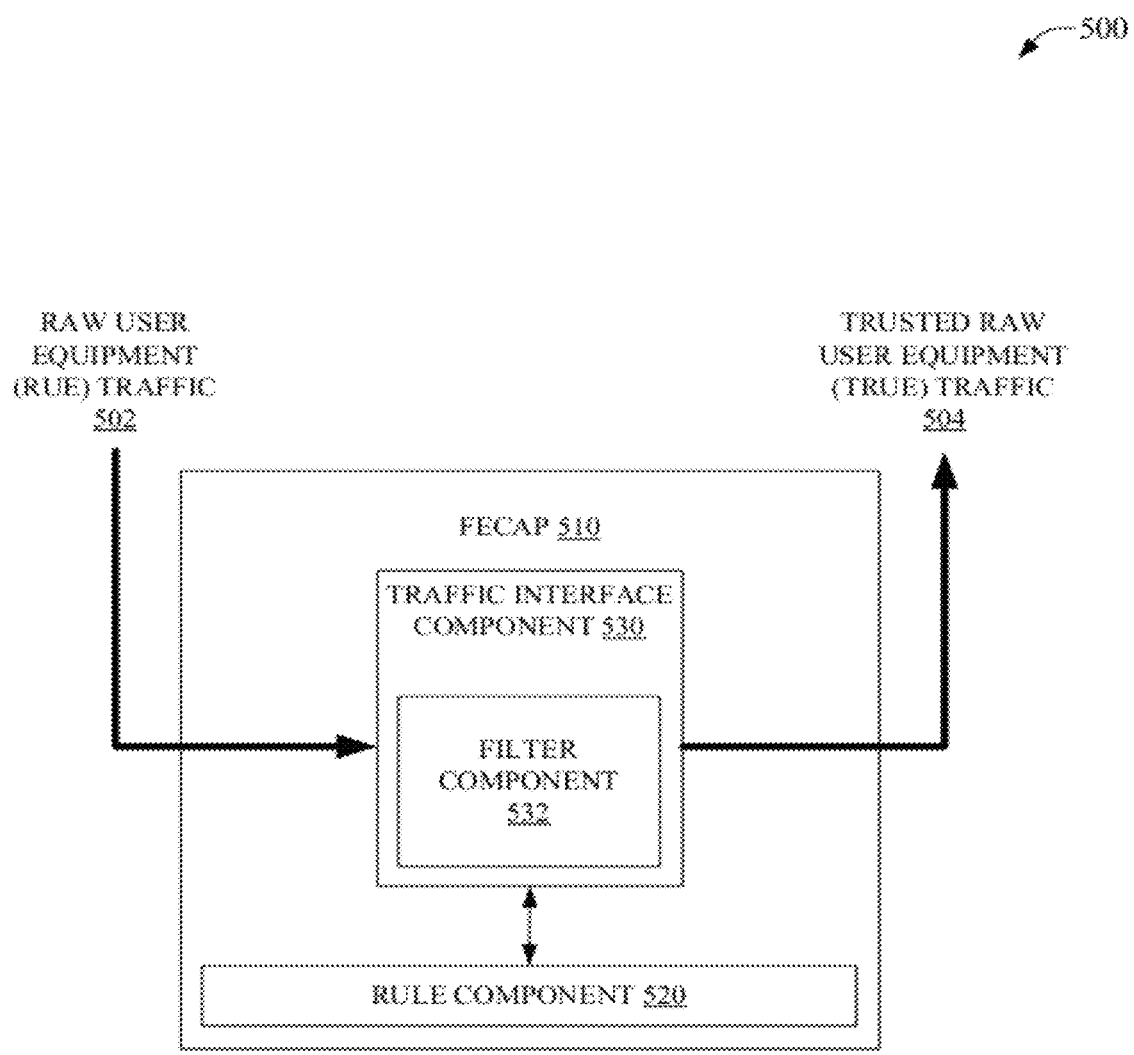
FIG. 5 is a depiction of a system that facilitates response to a cyber attack on a carrier network by employing a filter in accordance with aspects of the subject disclosure.

FIG. 5 is a depiction of a system 500 that facilitates response to a cyber attack on a carrier network in accordance with aspects of the subject disclosure. System 500 can include RUE traffic 502 and TRUE traffic 504. System 500 can further include FECAP 510 that can include TIC 530. TIC 530 can inspect RUE traffic 502. TIC 530 can be communicatively coupled rule component 520. Rule component 520 can apply one or more rules to the inspection of RUE traffic 502 at TIC 530 to determine compliance with the rule. Where RUE traffic 502 satisfies a predetermined rule applied by rule component 520, FECAP 510 can initiates a predetermined response.

TIC 530 can further include filter component 532. Filter component 532 can filter RUE traffic 502. The filtered RUE traffic 502 can be a subset of RUE traffic 502 and be labeled TRUE traffic 504. In some embodiments, rule component 520 can dynamically adapt filter component 532. As such, filter component 532 can alter the traffic flowing into a carrier network in response to the inspection or the RUE traffic 502. Filter component 532 can provide an additional tactic to alter the traffic flow when a response is determined. Other tactics can include the full or partial disablement of selected UEs, updating UE permissions variables dynamically altering the UEs that are allowed to authenticate to a carrier, rerouting of traffic to more robust carrier network systems, throttling of traffic for selected UEs, etc. In an aspect, filter component 532 illustrates direct interaction with traffic flowing through a carrier network (e.g., direct filtering of RUE traffic 502 to result in TRUE traffic 504), which can be different from inspection of the traffic flow and response that alter the traffic flow indirectly (e.g., disabling UEs, withdrawing authentication permissions, etc.).

Figure 6:
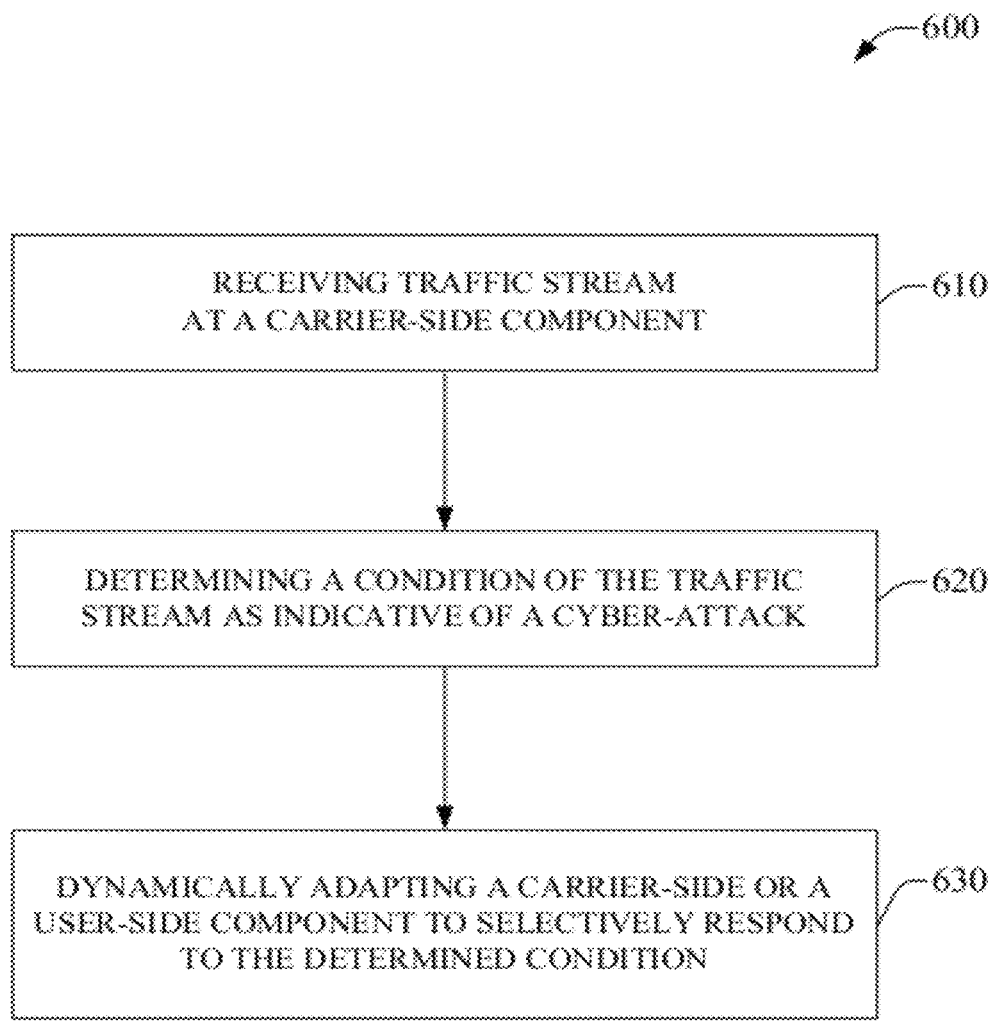
FIG. 6 illustrates a method facilitating response to a cyber attack on a carrier network in accordance with aspects of the subject disclosure.
Figure 7:
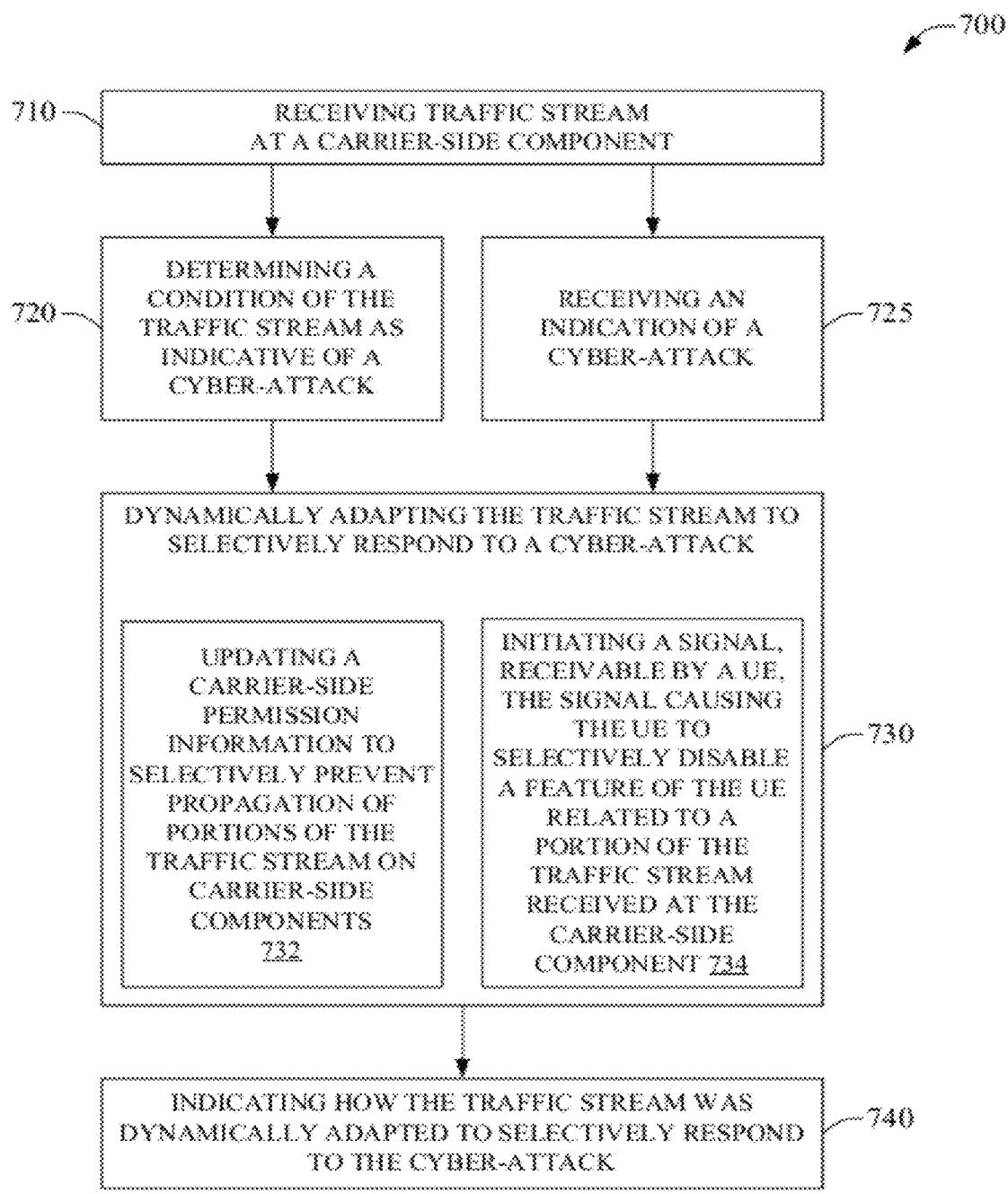
FIG. 7 illustrates a method for facilitating response to a cyber attack on a carrier network in accordance with aspects of the subject disclosure.

In view of the example system(s) described above, example method(s) that can be implemented in accordance with the disclosed subject matter can be better appreciated with reference to flowcharts in FIG. 6-FIG. 7. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of a method 600 facilitating response to a cyber attack on a carrier network in accordance with aspects of the subject disclosure. At 610, method 600 can receive a traffic stream at a carrier side component. The traffic stream can be received from UEs that are communicating across a carrier network. The traffic stream can be received at, or near, the front-end of a carrier network, such as at a front end processor of a SGSN or MME. At 620, the traffic can be inspected to determine a condition of the traffic stream. A condition of the traffic stream can be indicative of a cyber attack. This condition can indicate an impending cyber attack or a cyber attack that has already begun.

At 630, a carrier-side or user-side component can be dynamically adapted. This adaptation of a carrier-side or user-side component can be selective to response to the condition determined at 620. Adaptation of carrier-side components can include filtering the traffic stream, adapting authentication permissions for UEs associated with the determined condition at 620, throttling of traffic associated with the determined condition at 620, rerouting of traffic associated with the determined condition at 620 to systems deemed safe for the transport of said traffic, etc. Adaptation of user-side components can include signaling to fully or partially disable the transmission of the offending portion of the traffic stream. This can include remotely disabling UE, such as by transmitting a disabling code. At this point method 600 can end.

Method 600 can provide for an automatic response that can dynamically alter a traffic stream across a carrier network in response to a determined cyber threat. Method 600 can allow for passive inspection of a traffic stream in a manner that can be similar to a firewall. This passive inspection can prevent attacks on an inspecting system, such as a FECAP that is network transparent and has no network address. Moreover, where the inspection occurs at the front end of a carrier network, the traffic stream can be adapted before it reaches the core of the carrier network, such as preventing offending traffic from reaching router control lists, internal firewalls, or intrusion detection systems. Additionally, where method 600 is employed in a carrier network, the signaling associated with the method can employ layer-2 communications causing method 600 to be more robust to certain kinds of cyber attacks.

FIG. 7 illustrates a method 700 that facilitates response to a cyber attack on a carrier network in accordance with aspects of the subject disclosure. At 710, a traffic stream can be received at a carrier-side component. At 720, a condition of the traffic stream can be determined. This condition can be indicative of a cyber attack. At 725, an indication of a cyber attack can be received by method 700. An indication of a cyber attack can be received, for example, from an external security system, secondary security system, etc.

At 730, the traffic stream can be dynamically adapted to selectively respond to a cyber attack. The response can be proactive, such as by responding to an indication of a potential or imminent cyber attack, or can be responsive, such as by responding to a cyber attack already underway. Further, dynamically adapting the traffic stream can be by way of the updating at 732, the initiating a signal at 734, or combinations thereof.

At 732, the response can include updating a carrier-side permission information. This permission information can be associated with the normal propagation of a traffic stream across the carrier network such that updating the permission information selectively prevents propagation of portions of the traffic stream on carrier-side components. As a non-limiting example, an HLR can be updated to withdraw the authentication of a device sourcing offensive traffic.

At 734, a signal can be initiated that can be received by a UE. The signal at 734 can cause the receiving UE to selectively disable a feature of the UE related to the offensive traffic. As such, by initiating the signal at 734, method 700 can facilitate a full or partial disablement of a UE acting as a source of offensive traffic sent to the carrier network. As an example, a signal can be sent to a UE by an RNC to disable transmission of IP packets but allow voice communications transmissions to remain enabled.

At 740, method 700 can indicate how the traffic stream was dynamically adapted to selectively respond to the cyber attack. For example, 740 can include setting a variable or flag, generating an email, generating a form letter, generating a text message, flashing an indicator light, generating an indicator tone, etc. At this point, method 700 can end.

Figure 8:
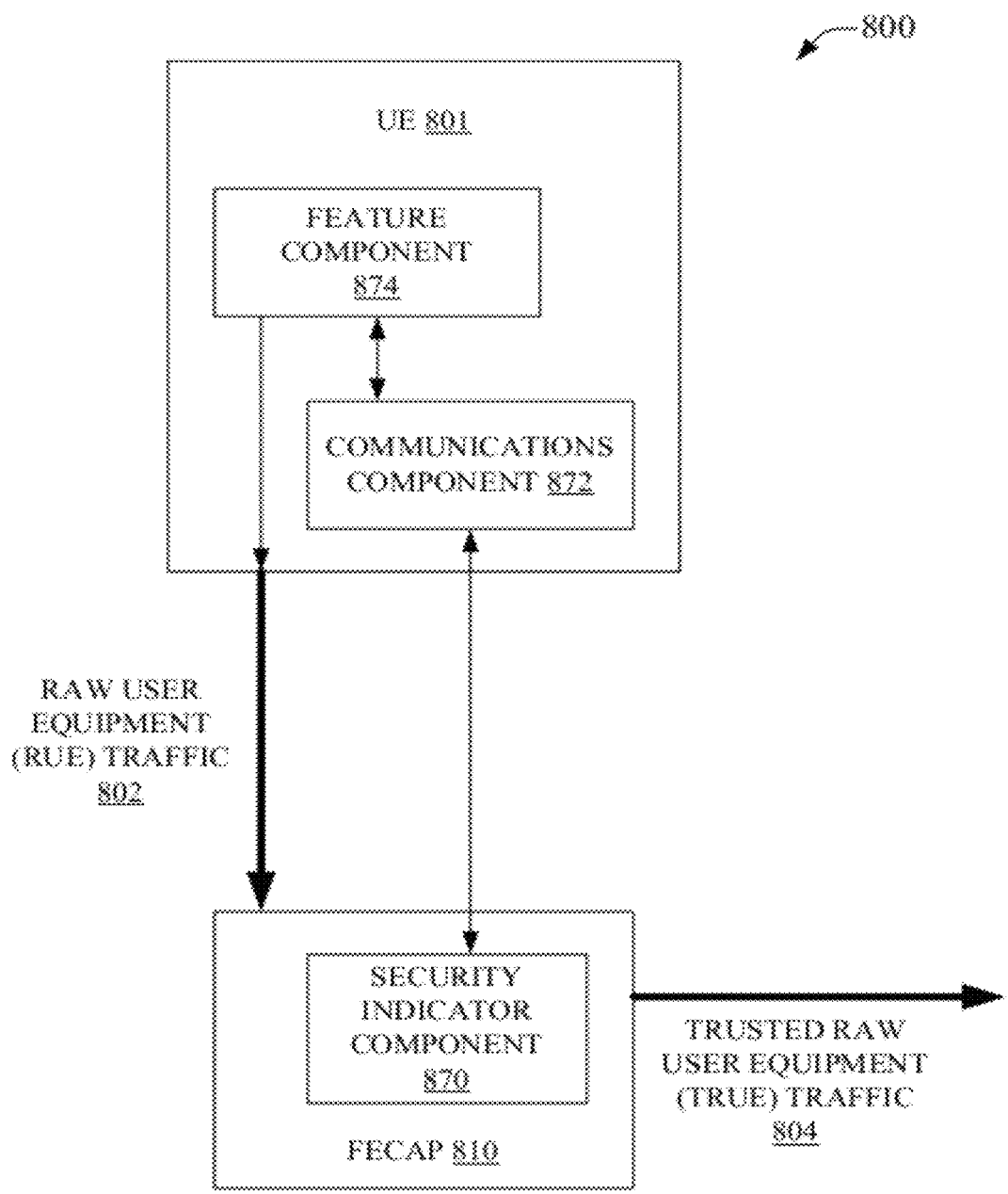
FIG. 8 illustrates a system for facilitating response to a cyber attack on a carrier network in accordance with aspects of the subject disclosure.

FIG. 8 illustrates a system 800 for facilitating response to a cyber attack on a carrier network in accordance with aspects of the subject disclosure. System 800 can include RUE traffic 802 and TRUE traffic 804. System 800 can further include FECAP 810. FECAP 810 can be located on the carrier-side as contrasted with user equipment (UE) 801 that can be located on the user-side of a wired or wireless telecommunications network interface. FECAP 810 can apply one or more rules to the inspection of RUE traffic 802 to determine compliance with the rule. Where RUE traffic 802 satisfies a predetermined rule applied by FECAP 810, a predetermined response can be initiated.

The predetermined response can include facilitating access to an indicator corresponding to limiting features of a UE (e.g., UE 801). Limiting features of the UE (e.g., UE 801) can include partially or totally disabling the generation or transmission of traffic. For example, limiting a feature of a UE (e.g., UE 801) can include disabling the transmission of all traffic from the UE, limiting data transmission to a particular speed or bandwidth, disabling transmission of non-voice data but allowing voice data, disabling transmission of all data except voice data and emergency data (e.g., e911 data, etc.), throttling the transmission of data, etc. Numerous other examples of limiting features of the UE are not further recited for brevity although all are considered within the present scope of disclosure.

System 800 fan further include security indicator component 870. Security indicator component 870 can facilitate access to an indicator corresponding to limiting features of a UE (e.g., UE 801). Security indicator component 870 can be co-located with FECAP 810 (as illustrated) though it is not so limited. In other embodiments, security indicator component 870 can be located separately from FECAP 810. As a non-limiting example, security indicator component 870 can be located at another portion of a telecommunications carrier network, distributed in a cloud-computing environment, at a GGSN, at a SGSN, at a MME, at a SAE, etc.

Security indicator component 870 can be communicatively coupled to communications component 872 of UE 801. Communications component 872 can facilitate receiving an indicator corresponding to limiting features of a UE (e.g., UE 801). As a non-limiting example, communications component 872 can receive an indicator to disable the transmission of data associated with a particular program executing on UE 801, the indicator being received from security indicator component 870.

Communications component 872 can further be communicatively coupled to feature component 874. Feature component 874 can dynamically interact with features of a UE (e.g., UE 801). This interaction can include limiting features of a UE, such as wholly or partially disabling features of a UE. Furthermore, features of a UE can include hardware features, software features, or hardware and software features. As a non-limiting example, a feature of a UE (e.g., UE 801) can be to transmit RUE 802, as such, feature component 874 can disable, in whole or in part, the transmission of RUE 802. As a second non-limiting example, a feature of UE 801 can include a selective filter for IP traffic included in RUE 802, wherein feature component 874 can dynamically adapt the selective filter to prevent or allow certain traffic from being included in RUE 802.

In some embodiments, where FECAP 810 determines a cyber-attack by analysis of RUE 802, security indicator component 870 can indicate that UE 801 should adapt the composition of RUE 802. This indication can be received at communications component 872 such that feature component 874 can dynamically adjust one or more features of UE 801 to facilitate the adaption of RUE 802. As a non-limiting example, feature component 874 can limit features of UE 801, such as by disabling an antenna, in response to the indication of security indicator component 870 by way of communications component 872. Numerous other examples are not recited here, though within the scope of the present disclosure, for brevity and clarity.

Figure 9:
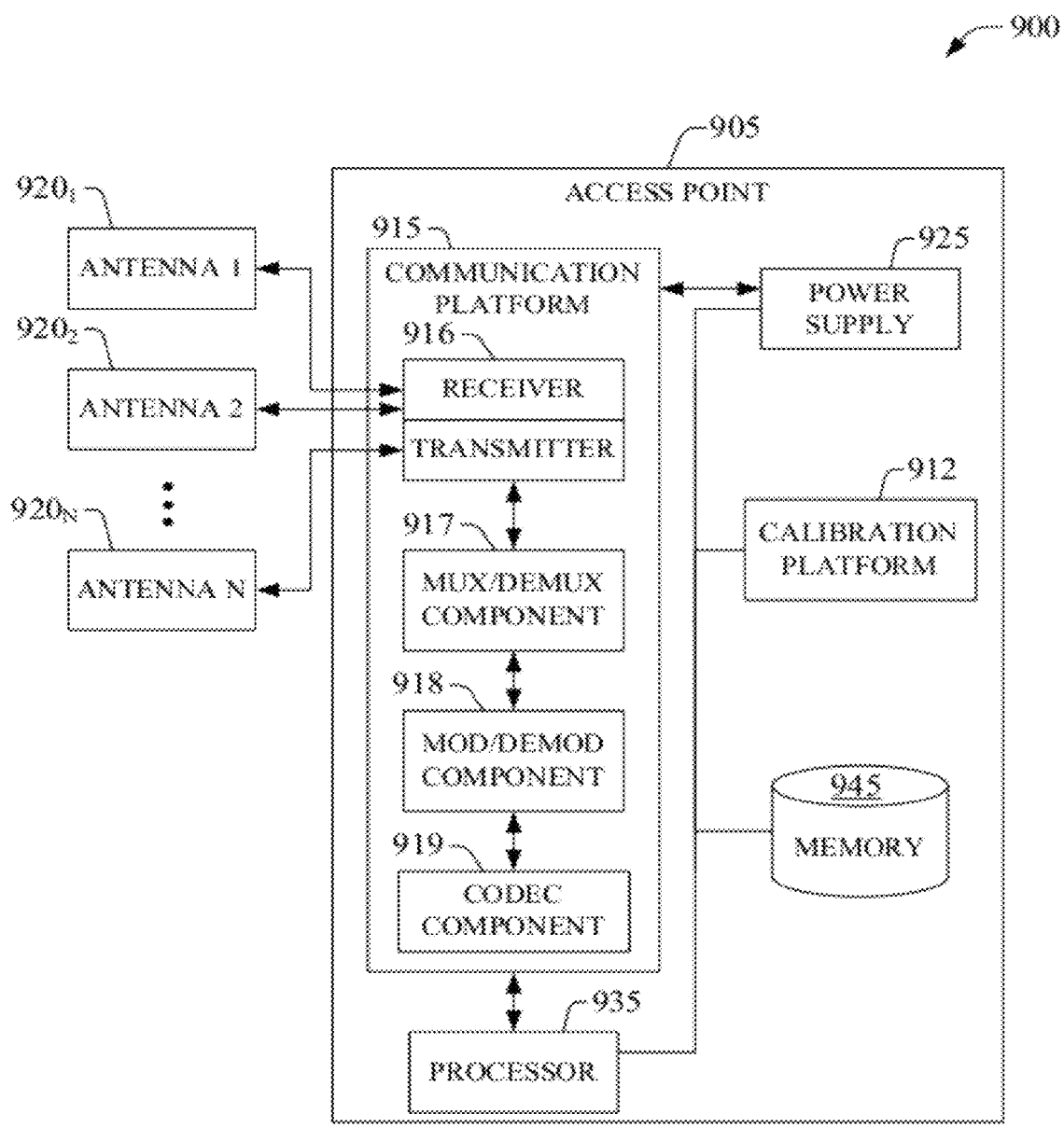
FIG. 9 illustrates a block diagram of an exemplary embodiment of an access point to implement and exploit one or more features or aspects of the subject disclosure.

FIG. 9 illustrates a block diagram of an example embodiment of an access point to implement and exploit one or more features or aspects of the subject innovation. Access point 900 can be part of a communications framework, for example, a femto-cell, a microcell, a picocell, a router, a wireless router, etc. In embodiment 900, AP 905 can receive and transmit signal(s) (e.g., attachment signaling) from and to wireless devices like femto-cell access points, access terminals, wireless ports and routers, or the like, through a set of antennas $920_1$-$920_N$ (N is a positive integer). It can be noted that antennas $920_1$-$920_N$ can be part of communication platform 915, which comprises electronic components and associated circuitry that provides for processing and manipulation of received electromagnetic signal(s) and electromagnetic signal(s) to be transmitted. Such electronic components and circuitry embody, at least in part, can comprise signaling and traffic components within a communication framework. In some embodiments, communication platform 915 can include a receiver/transmitter 916 that can convert signal from analog to digital upon reception, and from digital to analog upon transmission. In addition, receiver/transmitter 916 can divide a single data stream into multiple, parallel data streams, or perform the reciprocal operation. Coupled to receiver/transmitter 916 is a multiplexer/demultiplexer 917 that facilitates manipulation of signal in time and frequency space. Electronic component 917 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 917 can scramble and spread information (e.g., codes) according to substantially any code known in the art; e.g., Hadamard-Walsh codes, Baker codes, Kasami codes, polyphase codes, and so on. A modulator/demodulator 918 is also a part of communication platform 915, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 915 also includes a coder/decoder (codec) component 919 that facilitates decoding received signal(s), and coding signal(s) to convey.

Access point 905 can also include a processor 935 configured to confer functionality, at least in part, to substantially any electronic component in AP 905. Power supply 925 can attach to a power grid and include one or more transformers to achieve a power level that can operate AP 905 components and circuitry. Additionally, power supply 925 can include a rechargeable power component to ensure operation when AP 905 is disconnected from the power grid, or in instances, the power grid is not operating.

Processor 935 also is functionally connected to communication platform 915 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 935 is functionally connected, via a data or system bus, to calibration platform 912 and other components (not shown) to confer, at least in part functionality to each of such components.

In AP 905, memory 945 can store data structures, code instructions and program modules, system or device information, code sequences for scrambling, spreading and pilot transmission, location intelligence storage, determined delay offset(s), over-the-air propagation models, and so on. Processor 935 is coupled to the memory 945 in order to store and retrieve information necessary to operate and/or confer functionality to communication platform 915, calibration platform 912, and other components (not shown) of access point 905.

Figure 10:
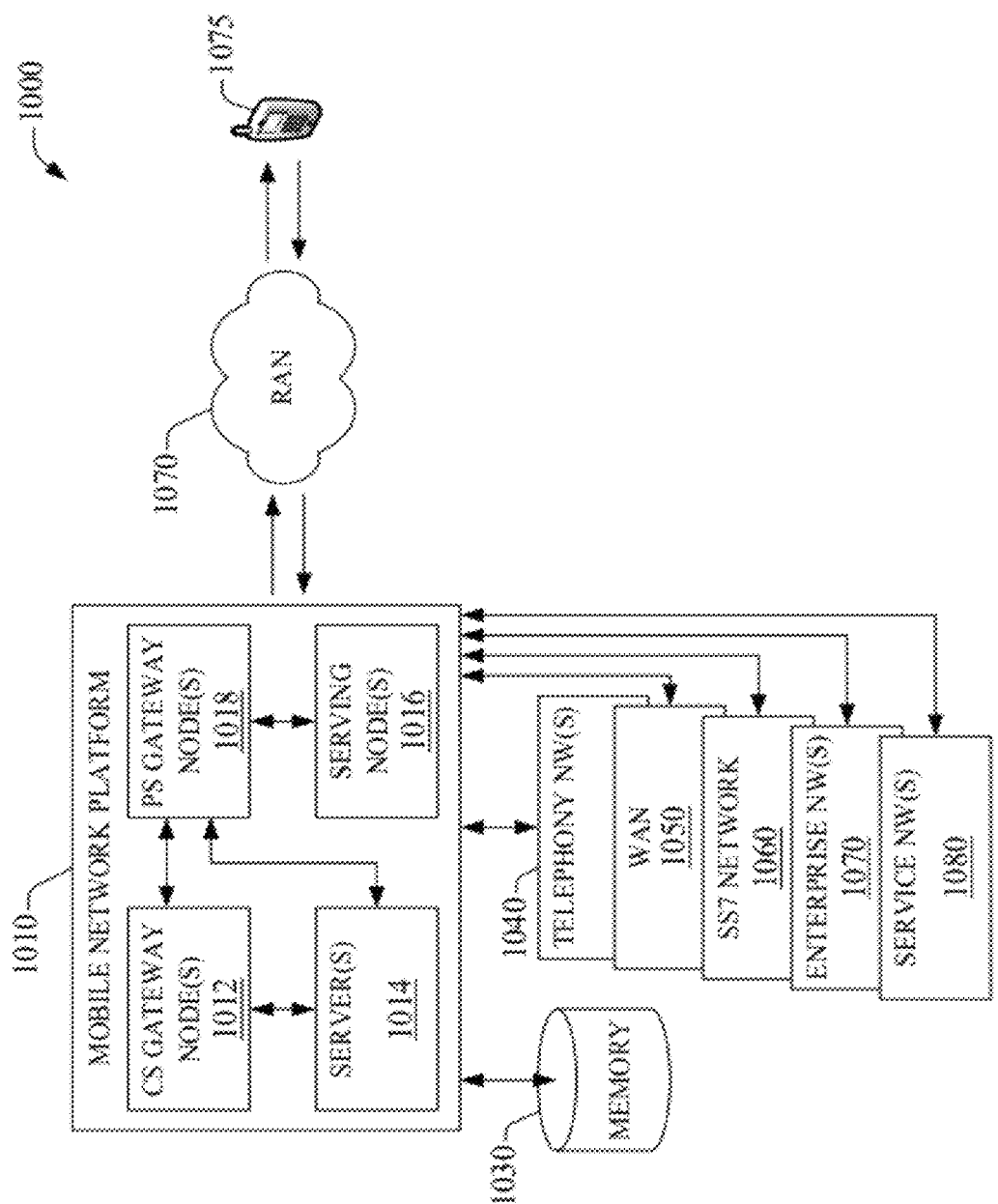
FIG. 10 is a block diagram of an exemplary embodiment of a mobile network platform to implement and exploit various features or aspects of the subject disclosure.

FIG. 10 presents an example embodiment 1000 of a mobile network platform 1010 that can implement and exploit one or more aspects of the subject innovation described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, such as those illustrated in part in FIG. 2 and discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in FECAP rule component 120, 320, 420, or 520, to store FECAP rules and/or responses, volatile memory 1020, non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 11:
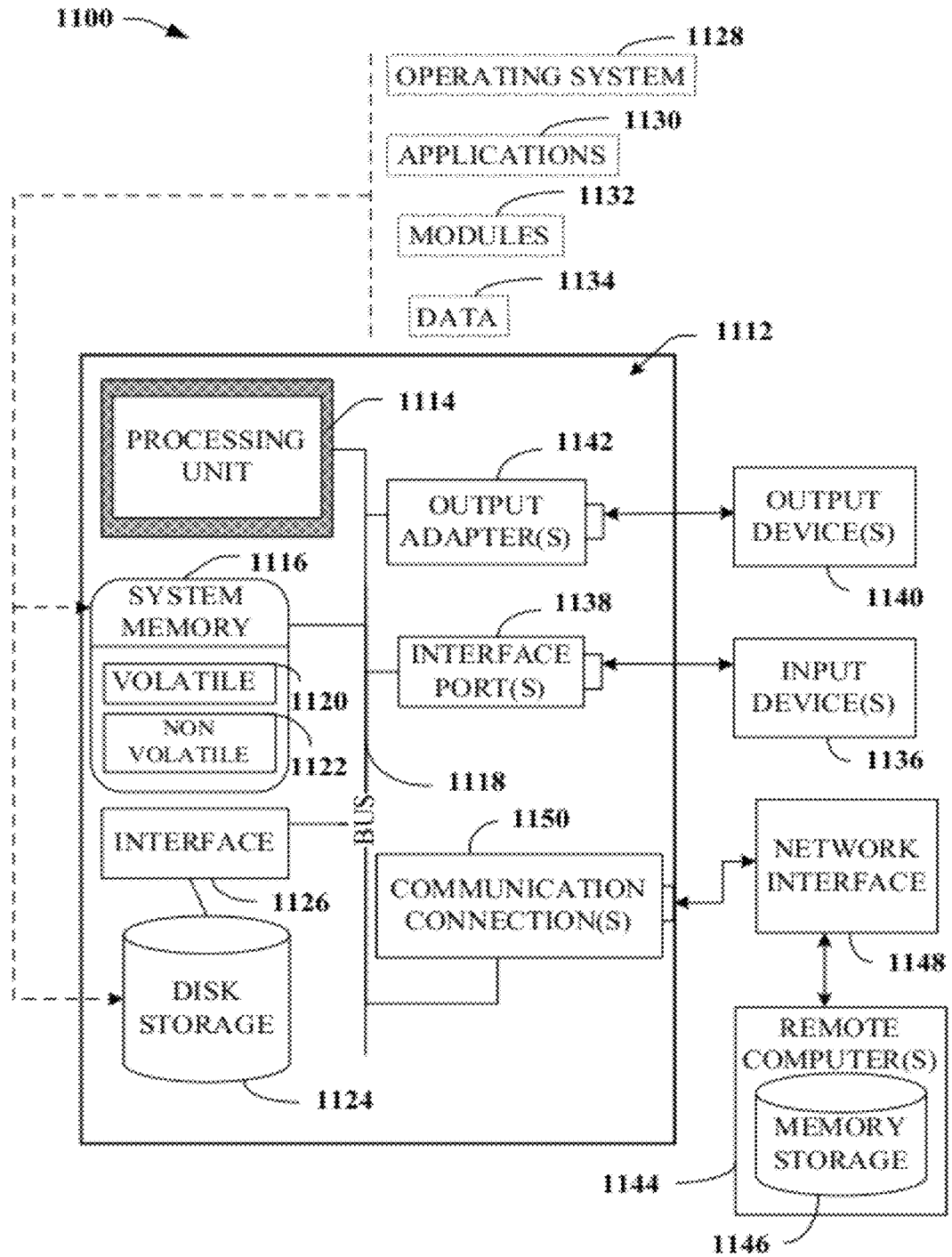
FIG. 11 illustrates a block diagram of a computing system operable to execute the disclosed systems and methods in accordance with an embodiment.

FIG. 11 illustrates a block diagram of a computing system 1100 operable to execute the disclosed systems and methods in accordance with an embodiment. Computer 1112 (which can be, for example, part of the hardware of a FECAP component (e.g., 110 to 510, etc.), a femto-cell (e.g., access point), etc., includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1116 includes volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128 (e.g., OS component(s) 324, etc.) Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1111 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A network device, comprising:
a memory that stores executable instructions; and
a processor, coupled to the memory, that facilitates execution of the executable instructions to perform operations, comprising:
receiving information comprising network traffic data at the network device, from a mobile device, to facilitate a response to a detected network attack, wherein the network device is located between a radio access network device and a serving general packet radio service support node device and the network device does not have a network address causing it to be network transparent;
analyzing the network traffic data of the information to determine a value related to a probability of the mobile device participating in the detected network attack;
facilitating an updating of a variable related to an access privilege employed in determining access to another network device by the mobile device;
in response to a defined condition relating to the variable being determined to be satisfied, altering the access privilege for the mobile device to access the other network device comprising decreasing a data rate of at least a portion of the information received from the mobile device, wherein the portion of the information is related to a type of the network traffic data corresponding to with the mobile device participating in the detected network attack; and
in response to another defined condition relating to the variable being determined to be satisfied, not altering at least another portion of the information received from the mobile device and generating an indicator facilitating disabling of a feature of the mobile device, wherein the other portion of the information is not related to the type of the network traffic data corresponding to the mobile device participating in the detected network attack.

2. The network device of claim 1, wherein the facilitating the updating of the variable comprises facilitating the updating of the variable at the other network device.

3. The network device of claim 2, wherein the network device is configured to receive the information before the information is routed via a wireless carrier network device.

4. The network device of claim 3, wherein the analyzing the information comprises facilitating the analyzing of the information at the other network device.

5. The network device of claim 1, wherein the facilitating the updating of the variable comprises communicating via a data link layer protocol.

6. The network device of claim 1, wherein the facilitating the updating of the variable comprises facilitating the updating of the variable at the other network device, the other network device comprising home location register information.

7. The network device of claim 1, wherein the altering the access privilege comprises allowing a portion of the information associated with emergency data to be communicated between the mobile device and the other network device, and blocking another portion of the information not associated with the emergency data from being communicated between the mobile device and the other network device.

8. The network device of claim 1, wherein the altering the access privilege comprises redirecting the information received from the mobile device to the other network device.

9. The network device of claim 1, wherein the altering the access privilege comprises blocking packet-switched information and allowing circuit-switched information between the mobile device and the other network device.

10. The network device of claim 1, wherein the operations further comprise:
receiving a rule relating to determination of the detected network attack from a data store communicatively coupled to the other network device.

11. The network device of claim 10, wherein the analyzing the information comprises facilitating applying the rule to the information at the other network device.

12. The network device of claim 1, wherein the analyzing the information comprises facilitating analyzing the information at the serving general packet radio service support node device of a wireless carrier network device.

13. The network device of claim 1, wherein the network device is located between the radio access network device and a mobility management entity device and the analyzing the information comprises analyzing the information at the mobility management entity device of a wireless carrier network.

14. A method, comprising:
receiving, by a system comprising a processor and located between a radio access network device and a mobility management entity device of a wireless carrier network, a traffic stream comprising network traffic data related to a user equipment other than the system, wherein the system is not associated with a network address rendering the system network transparent;
determining, by the system, a threat condition of the traffic stream indicative of a detected network attack;
allowing, by the system in response to a first rule related to the threat condition being determined to be satisfied, the user equipment to access a value indicating a function of the user equipment that should be disabled; and
adapting, by the system in response to a second condition relating to the variable being determined to be satisfied, a permission related to subsequent access to the traffic stream, resulting in decreasing a data rate of at least a portion of the traffic stream corresponding to the user equipment being determined to be participating in the detected network attack, and not modifying, in response to a third condition relating to the variable being determined to be satisfied, at least another portion of the traffic stream not corresponding to the user equipment being determined to be participating in the detected network attack.

15. The method of claim 14, wherein the adapting the permission comprises updating permission information stored at a wireless network device other than the user equipment and selectively preventing propagation of the traffic stream to another wireless network device in response to the adapting the permission.

16. The method of claim 14, wherein the adapting the permission comprises updating home location register information of the system.

17. The method of claim 14, wherein the adapting the permission comprises updating home subscriber server information of the system.

18. A non-transitory machine-readable storage medium, comprising executable instructions that, when executed by a processor, facilitate performance of operations, comprising:
receiving, by a device that does not have a network address causing it to be network transparent and that is communicatively coupled to a radio access network device and a mobility management entity device of a wireless carrier network, a security indicator related to altering access to traffic corresponding to a user equipment other than the device, wherein the altering comprises:

decreasing a data rate of at least a portion of the traffic associated with a cyber attack by the user equipment in response to a first defined condition relating to the security indicator being determined to be satisfied, wherein the portion of the traffic is related to a type of network traffic data corresponding to the user equipment participating in the cyber attack and withholding from altering at least another portion of the traffic not corresponding to the cyber attack by the user equipment in response to a second defined condition relating to the security indicator being determined to be satisfied, wherein the other portion of the traffic is not related to the type of network traffic data corresponding to the user equipment participating in the cyber attack, and wherein the traffic contributes to a traffic stream of the set of network devices, and wherein the security indicator is determined in response to inspection of the traffic stream and identification of a condition indicative of the cyber attack involving the user equipment;

in response to the security indicator satisfying a rule associated with user equipment feature truncation, designating, at the device, an indicator associated with restricting execution of a feature of the user equipment; and facilitating updating an access permission, at the device, based on satisfaction of the first defined condition relating to the security indicator.

19. The non-transitory machine-readable storage medium of claim 18, wherein the operations further comprise:

facilitating access to the access permission by a network device of the wireless carrier network enabling the network device to alter access to the traffic contributing to the traffic stream of the wireless carrier network.

20. The non-transitory machine-readable storage medium of claim 18, wherein the facilitating the updating of the access permission comprises facilitating the updating of home location register information on the device based on the security indicator.

* * * * *